United States Patent
Sherman et al.

[15] 3,687,168
[45] Aug. 29, 1972

[54] DUCT SYSTEM

[72] Inventors: James Webster Sherman; James William Helmick, both of Toledo, Ohio

[73] Assignee: Johns-Manville Corporation, New York, N.Y.

[22] Filed: June 29, 1970

[21] Appl. No.: 50,595

[52] U.S. Cl............138/109, 138/155, 138/DIG. 4, 220/80, 285/424
[51] Int. Cl.............................................F16z 9/22
[58] Field of Search..52/496, 730; 98/40 C; 138/103, 138/106, 109, 149, 155, 156, 177, 178, DIG. 2, DIG. 4, DIG. 8; 217/63; 220/80; 285/424

[56] References Cited

UNITED STATES PATENTS

| | | |
|---|---|---|
| 2,498,753 | 2/1950 | Deitsch..................285/424 X |
| 2,632,534 | 3/1953 | Grey.......................52/496 X |
| 3,001,805 | 9/1961 | Jones et al. ............285/424 X |
| 3,078,880 | 2/1963 | Stephens........138/DIG. 2 UX |
| 3,092,529 | 6/1963 | Pearson..........138/DIG. 2 UX |

*Primary Examiner*—Edward J. Earls
*Attorney*—John A. McKinney and Robert M. Krone

[57] ABSTRACT

An aluminum extrusion molding with multiple flanges for gripping and supporting both duct board paneling and longitudinal support members. Duct structures are made of the above molding in combination with duct board paneling wherein a single piece of molding is formed into a duct board frame defining the periphery of the duct. The molding gripping flanges have extended beads for gripping the duct board which beads also enhance the seal between molding and duct board.

10 Claims, 7 Drawing Figures

PATENTED AUG 29 1972  3,687,168

INVENTORS
JAMES W. SHERMAN
JAMES W. HELMICK
BY
Wilson & Fraser
ATTORNEYS

DUCT SYSTEM

BACKGROUND OF THE INVENTION

Duct work for ventilating and humidity systems and the like traditionally was fabricated out of sheet metal and covered with insulating materials. More recent developments have led to ducts constructed of insulating materials in the form of boards or panels having sufficient rigidity to eliminate the requirement of a metal duct for certain uses. This type duct was constructed by stapling and taping the boards into, typically, a rectangular duct section with each side of the duct consisting of a board. The required number of duct sections were then butted end to end and the joints taped to form a continuous duct of the desired length.

The taping served two functions: (1) it held the boards in a structural shape which shape had sufficient stiffness to make the duct self supporting, and (2) sealed the duct making it an air tight structure thereby increasing its efficiency for the purpose of directing air or like type gaseous flow.

Ducting so constructed was usually suspended from the ceiling of the structure in which it was installed by means of wire or strap supports in the form of slings passing underneath the duct periodically along the length of the duct.

The problem with this type construction was the structural weakness of the duct and the tape joints, plus the lack of rigidity of the suspended system which took on the nature of a suspended pendulum. The weakness of the taped joint, from the structural standpoint, prevented long spans of ducting between support points, and this problem was further aggravated by the weakness of the insulating board material, which would sag between supports on long spans. Further, the weakness of the insulating board material put significant limitations on the duct system with respect to the pressure differential between the inside and the outside of the duct, since the board was subject to bowing.

Where the weakness problem was sought to be overcome by the addition of steel support members to join and support the boards, it was found that a leakage problem thereby arose between the supports and the board which could only be solved by duplication of effort. The joints had to be taped to seal them where steel was used to support the insulating board.

The present invention overcomes these problems with a duct board molding and longitudinal support in combination with the molding forming a rigid structural frame for the duct board in all directions. The frame supports both structurally and against system pressure differentials allowing the suspension support points to be spread out, and provides a rigid structure which can in turn be suspended rigidly in place.

In addition, the molding has a unique sealing characteristic when used in combination with insulating duct board having resiliency when the faces of the board are pressed together. Thus, the joints of molding to the board do not have to be taped to obtain the desired seal. Elimination of the taping requirement overcomes the problem of having to tape joints in place, which is especially troublesome when the duct is installed nearly flush to ceiling or walls.

SUMMARY

The present invention relates to moldings and duct systems and more particularly to moldings for use with duct board and duct systems constructed of duct board with molding for joints as well as longitudinal supports.

The molding consists of an aluminum extrusion with flanges stacked one above the other and interconnected by a rectangular web attached symmetrically to and at right angles with the faces of the flanges. The end flanges are attached to the edge of the web and extend over the length of the web. One end flange is shorter in width than the other end flange and this other end flange has beads extending from the face of the end flange along the extremities of the end flange opposing like type beads on the extremities of the face of the intermediate flange. These beads are continuous over the length of the flanges and exist on the face extremities of the flanges on both sides of the web. The end flange, which is shorter in width, has a radius on the corners facing the intermediate flange and extending over the length of the flange.

The molding in conjunction with paneling, such as duct board, is fabricated into duct frames with suitable connecting means, with the frames serving as joints and supports for the paneling. The paneling is intermittantly joined and supported over the periphery of the molding frame with the inner periphery of the frame consisting of the end flange of the molding sequentially bent to bring the ends of the molding together in an enclosed perimeter. The other end flange, intermediate flange and web are severed to free the flange for bending. The paneling joint is achieved by frictional engagement between the beads on the flanges of the molding and the paneling. The friction force occurs when the paneling is deformed upon insertion in the molding, with the resiliency or rebound characteristics of the paneling giving rise to a normal force against the beads which constrict the paneling from returning to the shape prior to deformation, that is, the pre-stressed shape of the paneling.

Further, the molding frame is uniquely amenable to longitudinal supports for the duct, thereby providing for rigid duct suspension as well as duct support in all directions.

The molding provides a simply fabricated, light weight, ductile joint to replace the taped and stapled joint for duct board. A seal of a dual nature by virtue of a bead contacting both faces of the paneling inserted in the molding is a feature in addition to the mechanical gripping of the beads. Further enhancing of the seal between mold and paneling is achieved by the flow path pattern which any leakage is forced to follow because the path is made more intricate by the unique mating of the molding to the paneling.

Other objectives of the molding are the lower cost of the aluminum extrusion over the prior art steel supports, and further economic savings in the case of assembly in place over the taped joint.

The duct system of molding frame and duct board or the like type paneling provides a rigid structure to replace the weaker duct system where duct segments were butted and taped together. The addition of longitudinal support in conjunction with the molding frame results in a rigid support structure for panel type ducts which rigidity was only achieved by sheet metal ducts in the prior art.

Further objects of the present invention are a duct system which can be rigidly suspended, exceptionally well adapted to systems with larger pressure differentials from one side of the duct surface to the other, and more economical due to greater ease in field installation.

BRIEF DESCRIPTION OF THE DRAWINGS

The above objects and advantages of the invention will become readily apparent to one skilled in the art from reading the following detailed description of an embodiment of the invention when considered in the light of the accompanying drawings, in which.

DESCRIPTION OF THE PREFERRED EMBODIMENT

Figure 1:
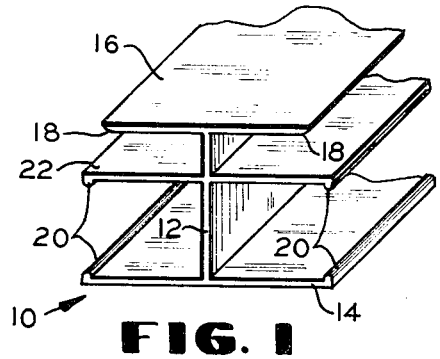
FIG. 1 is a fragmentary perspective view of a molding.

Referring to the drawings, FIG. 1 illustrates an aluminum extrusion molding 10 with a rectangular web 12 from which end flanges 14 and 16 extend symmetrically and at right angles to the web 12, being affixed to the edges of the web 12 over substantially the entire length of the web 12. One end flange 16 is shorter in width than the other end flange 14. The shorter end flange 16 has the corners extending over the length of the end flange 16 and facing the other end flange 14 rounded with a radius 18. From the face of the other end flange 14, which face is oriented toward the shorter flange 16, extend beads 20. The beads 20 cover the length of the end flange 14 extending at right angles to and located at the outer extremities of the end flange 14. A rectangular intermediate flange 22 extends from and is affixed to the web 12 being located in between and oriented parallel to the end flanges. This intermediate flange 22 is of a width identical to the longer end flange 14 with beads 20 along the length thereof duplicating and located opposing the beads 20 on the longer flange. While this molding is an extrusion of non-corrosive aluminum, clearly the molding could be made of other materials and by processes other than extruding.

Two features of the molding 10 are its ability to mechanically grip insulating board of a thickness equal to or exceeding the distance between opposed faces of end flange 14 and intermediate flange 22 as well as structural members having a press fit with the opposed faces of end flange 16 and intermediate flange 22, and the sealing characteristics of the beads 20 located on the flanges 14 and 22.

The mechanical gripping by the molding 10 is twofold. First, the beads 20 on the mating flanges 14 and 22 constrict insulating board of a resilient nature when such board is forced into the molding 10, and second, the shorter end flange 16, in conjunction with the intermediate flange 22, provides a force fit joint for additional support members. The frictional force from both joints is sufficient to result in rigid structures.

The seal between the molding 10 and insulating board resulting from the beads 20 constricting the insulating board is enhanced by the resiliency of the board against the beads 20 and further creates a maze type path for the flow pattern of any leakage.

These molding 10 features will be better understood when applied to the duct system described below, but it should be understood that the molding 10 of the present invention is not limited to use for duct systems only.

Figure 2:
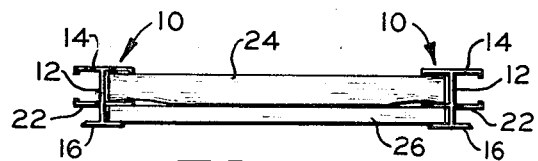
FIG. 2 is a typical assembly of duct board and longitudinal support between two pieces of molding.

The unique combination of molding 10, insulating board and longitudinal support is illustrated in the typical assembly of FIG. 2. Two moldings 10 are illustrated in end view between which a duct board 24 is supported by mating flanges 14 and 22 with beads 20 actually deforming the duct board 24. The distal spacing of the opposing beads 20 being less than that between the flanges 14 and 22, enhances the gripping and sealing between duct board 24 and molding 10. Due to the resilient nature of the duct board 24, the deformation is not of a permanent nature with the duct board returning to the shape prior to insertion into the molding 10 upon removal. This elasticity ability or resilient nature maintains, in effect, a pressure seal between duct board 24 and beads 20 while the deformation of the duct board 24 enhances the gripping of the duct board 24 by the molding 10, since in addition to the frictional holding force arising from the rebound of the duct board against the beads 20, the duct board 24 is mechanically worked in passing over the beads 20 upon being pulled from the mold. Clearly, where a low density board or possibly one without elasticity is used the ratio of open distance between flanges 14 and 22 to the open distance between opposing beads 20, resulting from the closing off of the opening between flanges 14 and 22 by the beads 20, can be varied to accommodate even those materials which simply displace the volume bounded by beads 20, flanges 14 and 22, and web 12.

Where required in extreme cases, such as high pressure duct systems, an adhesive can be applied between the duct board 24 and the web 12 to further enhance sealing and gripping.

The duct board 24 is typically a fibrous glass compressed mat which is resin bounded and cured to give it elasticity, with a scrim reinforced foil liner affixed to one face with flame retardant adhesive.

For additional support and rigidity, the ends of a longitudinal support 26 can be press fitted between the short end flange 16 and intermediate flange 22 of the molding 10, as illustrated in FIG. 2. The gripping feature of the molding 10 described above can now be seen to provide not only support means for the longitudinal support 26, but a structural tie between the molding 10. The structural tie will be seen to form a box construction in conjunction with the molding 10 when the duct system construction is explained below. In addition, the longitudinal support 26, being centered on the face of the duct board 24, provides rigid support at the point of maximum moment and deflection of the duct board 24. This type deflection of the duct board 24 has been a detriment to duct systems of wide span having large face surface areas, especially when used in combination with substantial pressure differential from one side of the duct board 24 to the other. Such deflection or bowing tends to pull the mating joints where the duct board 24 is butted together, apart, thereby weakening the joint and giving rise to possible leakage problems.

Figure 3:
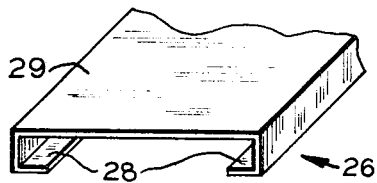
FIG. 3 is a fragmentary perspective view of a longitudinal support.

The longitudinal support 26, illustrated in FIG. 3, is typically an aluminum extrusion, but in similarity to the molding 10 could be fabricated or otherwise constructed as well as being made of other materials. The channel type cross-section of the longitudinal support 26 results in structural rigidity. The flanges 28 in conjunction with the channel legs to which the flanges 28 are affixed form resilient members which can readily be forced between the shorter end flange 16, plus the leading surface provided by the intermediate flange 22 extending beyond the end flange 16, further aiding insertion. Once inserted, the longitudinal support flanges 28 and the back 29 of the channel shape create a force which is normal against the shorter end flange 16 and the intermediate flange 22, respectively. This orientation of the longitudinal support places the back 29 of the channel shape against the duct board 24 providing a wide face area for supporting the duct board 24.

Figure 4:
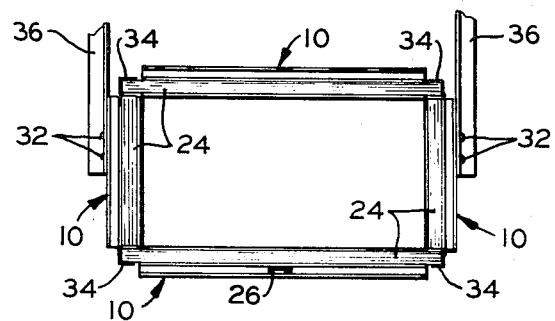
FIG. 4 is an end view of a duct for a positive pressure system.
Figure 5:
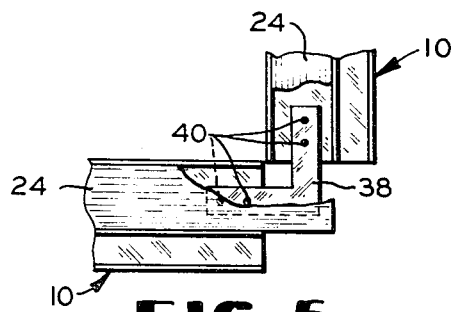
FIG. 5 is an enlarged fragmentary view of the connecting means for the molding in FIG. 4 with portions of the duct wall broken away to reveal the connection.

FIG 4 illustrates the further utility of the molding in a positive pressure duct system. The typical system illustrated consists of a single piece of molding 10 bent into a rectangular frame with the inner flange of the frame being the larger end flange 14. The remaining flanges 16 and 22 and the web 12 are cut normal to the face of the bent flange 14 at the point of bending to free the larger end flange 14 for bending. Three 90° bends are imparted to the larger end flange 14 resulting in the two ends of the molding being brought together. These ends are then fastened by a flat angle 38 which is screwed to the molding web 12 with metal screws 40. The frame now being formed, the duct system is completed by inserting duct board 24 of the glass fibrous nature and in the manner described above and illustrated in FIG. 2. For a rectangular duct, as illustrated in FIG. 4, the duct board 24 consists of four rectangular pieces of board which overlap at the corners. These corners are then taped along the length of the duct to form a gas tight periphery for the duct. The tape 34 is typically an acqueous thermo-setting flame retardant type, but can be of other suitable types such as pressure sensitive tape. Further, the present invention is not limited to the use of glass fibrous duct board 24 as described in the typical embodiment, but rather any board with sufficient volume displacement or elasticity to exert force against the beads 20 of the molding 10 is suitable. Repetition of the fabrication steps described above with molding 10 periodically interspaced between suitable lengths of duct board 24, results in the capability to construct a duct of any desired length.

The type of frame formed from the molding 10, illustrated in FIG. 4, in the typical embodiment of the invention is most suitable for ducts with small perimeters which can be fabricated from a single piece of reasonable length molding. As duct size increases, the availability of the required length of molding 10 may well dictate that the frame be made of two bent pieces of molding 10 or possibly four pieces of molding 10.

Where the length or width spans of the duct board of the duct in the typical embodiment of FIG. 4 are long enough to require support against bowing, the longitudinal support 26 illustrated can be added. The longitudinal support 26 is inserted into the molding and held as described and illustrated above in FIG. 2 by a friction force arising from the force fit between the longitudinal support 26 and the molding 10. The longitudinal support 26 is located in the middle of the duct board 24 where the maximum deflection of the duct board 24 would occur. Since the duct system illustrated in FIG. 4 is a positive pressure system with the internal duct pressures exceeding those outside the duct, the longitudinal support 26 is placed with the back 29 facing the outside of the duct board 24 resulting in any deflection tendency in the duct board 24 being prevented when the duct board 24 is pushed outward against the longitudinal support 26. Clearly, the application of the longitudinal support 26 is available over the periphery of the duct and in the typical embodiment of the invention, in FIG. 4, where the duct is rectangular, the longitudinal support is applicable to all four sides.

Further, where four supports are used, it is obvious that a box has been formed to encase the duct in all directions while at the same time providing a longitudinal support structure for the duct which is structurally independent of the duct board 24. Since the friction force which retains the longitudinal support 26 in the molding 10 also resists removal of the longitudinal support 26 from the molding 10, a duct frame of a very rigid nature results. When this type structure is suspended from a ceiling by angles 36 or the like type structural supports fastened to the molding 10 by metal screws 32, a rigid suspension system results. A system with this type of rigidity is not possible where the duct board 24 is relied on as a structural member due to the board's more flexible nature.

It becomes apparent that two distinct duct systems are available through use of the molding 10 of the present invention, those using molding 10 and duct board 24, only, for less demanding pressure systems of a smaller size, and those of a larger size with pressure which tends to bow the duct board 24 and which therefore require in addition, longitudinal supports 26.

Figure 6:
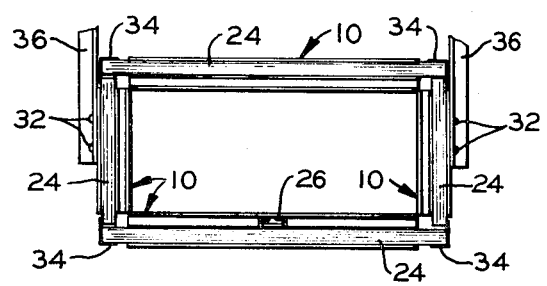
FIG. 6 is an end view of a duct for a negative pressure system.

The molding 10 and longitudinal support 26 can be reversed, when fabricated, to place the shorter end flange 16 of the molding 10 on the inside of the duct. This places the longitudinal support, when used, within the duct also. This type construction is suitable for negative type pressure systems where the pressure outside the duct exceeds that within the duct. Such a system is illustrated in FIG. 6. Insertion and overlapping of the duct board duplicates that of the positive pressure system as does that of sealing the corner joints with tape 34 and suspending the duct system by use of angles 36 attached to the molding 10 with metal screws 32. But the molding 10 is bent on the shorter end flange 16 with the longer end flange 14, intermediate flange 22 and web 12 being severed at the joints to be bent to free the shorter end flange 16 for bending. Reversal of the longitudinal support results in the back 29 of the channel like structure again facing the duct board 24, but now being in a position to resist deflection of the duct board 24 inward due to the external pressure on the duct board 24 being greater than the pressure within the duct system. While only one longitudinal support 26 is shown, as in the positive pressure system, longitudinal supports 26 are applicable over the entire periphery of the duct.

Figure 7:
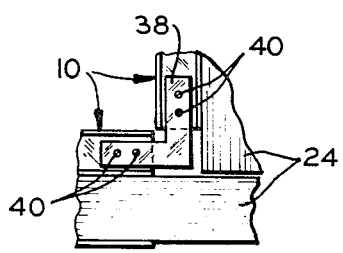
FIG. 7 is an enlarged fragmentary view of the mold connecting means in FIG. 6.

FIG. 7 illustrates the connecting means for the molding 10 in FIG. 6 consisting of a flat angle 38 attached to the web 12 between the shorter end flange 16 and the intermediate flange 22 with metal screws 40. The connection completes the periphery of the frame encompassed by the molding 10 making the periphery continuous.

It becomes apparent that the present invention may be used in modified forms other than those of the typical embodiment. For example, clearly only two flanges 14 and 22 having beads 20 and a web 12 are necessary to make the molding 10 adaptable to receive panelling, and it is further sufficient if the flanges 14 and 22 extend from the web 12 in one direction only to form a shape similar to a structural channel. The flanges 14 and 22 need not be parallel.

Where sealing is not a prime consideration, the beads 20 may be intermittant rather than continuous over the length of the flanges 14 and 22. The beads 20 need not be located at the longitudinal edge of the flanges 14 and 22 but simply spaced out away from the web 12.

When the web 12 is extended beyond either flange 14 and 22, employed in the channel shape described above, the web 12, becomes a tab which is useful as an attaching means where the panelling in the form of a duct is to be butted against a wall and the molding 10 used as a terminating means.

Again, while the above channel shape is combined in a back to back arrangement for butt connecting panelling in the typical embodiment, the orientation could just as easily be that of having one channel shape at right angles to the other, with the legs of the channel, flanges 14 and 22, extending outwardly, to form a corner molding 10.

The present invention is a molding 10 which, when combined with a longitudinal support 26 and duct board 24, forms a duct system.

The molding, being an aluminum extrusion, is lighter in weight than the steel supports of the prior art and also non-corrosive. The greater ductility of the aluminum molding over steel makes the aluminum molding suitable for forming by bending and fabricating with the use of metal screws. The beads 20 on the molding 10 provide not only a structural gripping support but a seal as well. This seal is further enhanced by the shape of the molding 10 which, in conjunction with the duct board 24 creates an intricate path for any potential leakage to follow with a bead seal inside as well as outside.

The greater flexibility of the molding 10 makes it especially suitable for duct systems formed basically of duct board 24 wherein the molding 10 in the form of a frame provides both a suspension means and convenient joint for butting the duct boards as well as periphial support. The butted joint between duct boards is such that the joiner of two segments of a duct system can be accomplished in place, next to a ceiling, for instance, with lateral movement which is more easily accomplished than taping the joint as in the prior art.

With the addition of a longitudinal support 26 or supports rigidity previously unavailable, outside of in metal duct systems, is obtainable making rigid installations possible as well.

The aluminum molding 10 is more economical than steel molding and also less expensive from the standpoint of fabrication in duct systems being easy to form into frames, having simple force fits for duct board 24 and longitudinal supports 26, and eliminating the taped joint which is often difficult to achieve with the duct in place.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit or scope.

What is claimed is:

1. A duct comprising:
a frame transverse with respect to said duct and generally defining the cross-sectional configuration of said duct, said frame comprising a molding having first and second flanges spaced with respect to each other and joined by a web, said molding being closed upon itself with the web lying in a plane transverse with respect to said duct, said first and second flanges having opposed major faces, said first flange having a bead extending longitudinally thereof and projecting toward the opposed major face of said second flange, said second flange having a bead extending longitudinally thereof and projecting toward the opposed major face of said first flange, said beads being spaced from said web and each other, panelling of yieldable resilient material, said panelling having transverse edges which are greater in thickness than the spacing between said beads and substantially equal to the spacing between said flanges, said transverse edges of said panelling being fitted between said beads of said molding whereby said beads compress and frictionally engage said panelling to impede any flow of fluids between said panelling and said molding, said panelling having at least two longitudinal edges extending from said transverse edges and in proximity to each other, and means to couple said proximate longitudinal edges to form a duct.

2. The duct according to claim 1 wherein said panelling has a thickness less than the spacing of said flanges and greater than the spacing normal of said flanges between said beads.

3. The duct according to claim 1 wherein said web extends beyond said first flange on the side of said flange opposite said second flange and including a third flange affixed to said web and generally parallel to said first flange a given distance therefrom, and a structural member having a portion of a thickness to fit between said third and first flanges with a press fit has an edge received between said third and first flanges whereby said molding and said structural member are secured together.

4. The duct according to claim 3 wherein there are a pair of said frames which are spaced from each other and said structural member is a longitudinal support extending between said frames and having an edge portion press fitted between said third and first flanges of each frame.

5. The duct according to claim 4 wherein said structural member is of elongated form having a major element having a front and rear face and at least one flange extending from said front face of said major element a distance from said rear face of said major element corresponding generally to a distance greater than the spacing between said third and first flanges whereby said element and flange have a press fit between said third and first flanges.

6. The duct according to claim 5 wherein said rear face of said major element is adjacent said panelling.

7. The duct according to claim 6 wherein said panelling is closed upon itself in planes perpendicular to the plane of said web to form a closed duct adapted a convey fluids under positive pressure relative to ambient, and wherein said third flange of said molding is exterior of said closed duct.

8. The duct according to claim 6 wherein said panelling is closed upon itself in planes perpendicular to the plane of said web to form a closed duct adapted to convey fluids under negative pressure relative to ambient, and wherein said third flange of said molding is within said closed duct.

9. The duct according to claim 1 including fourth and fifth flanges on said molding complementary to said first and second flanges respectively and extending from an opposite side of said web in registry with said first and second flanges, said fourth and fifth flanges having opposed major faces, a bead extending longitudinally of said fourth flange and projecting toward the opposed major face of said fifth flange, a bead extending longitudinally of said fifth flange and projecting toward the opposed major face of said fourth flange, each of said beads on said fourth and fifth flanges being spaced from said web, additional panelling of yieldable resilient material, said additional panelling having transverse edges which are greater in thickness than the spacing between said beads of said fourth and fifth flanges and substantially equal to the spacing between said fourth and fifth flanges, said transverse edges of said additional panelling being fitted between said beads on said fourth and fifth flanges, said additional panelling having at least two longitudinal edges extending from said transverse edges thereof and in proximity to each other, and means to couple said proximate longitudinal edges of said additional panelling to form a duct section.

10. The duct according to claim 1 wherein said panelling is a mat of resin bounded glass fibers.

* * * * *